United States Patent [19]

Brichard et al.

[11] 4,321,301

[45] Mar. 23, 1982

[54] PROCESS FOR STABILIZING PARTICLES OF PEROXYGENATED COMPOUNDS

[75] Inventors: Jean Brichard, Vilvoorde; Jean-Claude Colery, Brussels, both of Belgium

[73] Assignee: Interox, Brussels, Belgium

[21] Appl. No.: 868,334

[22] Filed: Jan. 10, 1978

[30] Foreign Application Priority Data

Jan. 10, 1977 [LU] Luxembourg .............................. 76548

[51] Int. Cl.$^3$ .......................... B32B 5/16; B32B 9/00
[52] U.S. Cl. ...................... 428/403; 252/99; 423/275; 427/212; 427/213; 427/215; 427/424; 427/427
[58] Field of Search ............... 427/213, 421, 215, 427, 427/212, DIG. 10; 252/99; 428/403; 423/275

[56] References Cited

U.S. PATENT DOCUMENTS

| 2,690,377 | 9/1954 | Lefforge et al. | 423/275 |
| 3,917,663 | 11/1975 | Kegelart et al. | 423/415 |

FOREIGN PATENT DOCUMENTS

| 49-6760 | 2/1974 | Japan . |
| 1300855 | 1/1971 | United Kingdom . |
| 1466799 | 4/1974 | United Kingdom . |

*Primary Examiner*—S. L. Childs
*Attorney, Agent, or Firm*—Spencer & Kaye

[57] ABSTRACT

Process for stabilizing particles of peroxygenated compounds by coating by means of a solid coating agent comprises applying a coating agent which contains at least one boron compound from metaboric acid, orthoboric acid and tetraboric acid.

28 Claims, No Drawings

PROCESS FOR STABILIZING PARTICLES OF PEROXYGENATED COMPOUNDS

BACKGROUND OF THE INVENTION

The present invention relates to a process for stabilizing, by coating, particles of peroxygenated compounds, the particles of peroxygenated compounds thus obtained, as well as washing or bleaching compounds containing such particles.

It is well known that peroxygenated compounds can be used as bleaching compounds in detergent powder mixtures. In the usual household detergents, sodium perborate tetrahydrate is generally used as a bleaching compound, as it is relatively stable to decomposition in a powdered detergent medium. However, it is becoming more and more common to use cold washing and soaking techniques for linen in which sodium perborate has the disadvantage of dissolving too slowly at 20° C.

To rectify this disadvantage, it has been suggested that powdered detergents be used in a mixture with many other peroxygenated compounds, notably alkali metal percarbonates, perphosphates and peroxymonosulfates, which have suitable dissolution rates. These peroxygenated compounds, particularly percarbonates, decompose too quickly in the powdered state, especially if they are stored in a humid atmosphere. Furthermore, the other constituents of the cleaning compounds may activate this decomposition even more.

With a view to avoiding this shortcoming, it has been suggested in French Pat. No. 750125, filed on Nov. 30th, 1932, in the name of Oesterreichische Chemische Werke Gesellschaft, that various types of stabilizing agents be introduced during the manufacture of the peroxygenated compounds by reacting salts or corresponding solid oxides with an aqueous solution of hydrogen peroxide, these stablizing agents being capable of dissolution in the aqueous solution of hydrogen peroxide and/or mixtures in solid phase with the original oxides or salts. The products thus obtained do not, however, have a sufficient stability. Moreover, their active oxygen content is not high.

In order to improve the stability of the peroxygenated compounds, it has also been suggested that the peroxygenated compounds be mixed in the solid phase with metaboric acid, as disclosed in Japanese patent application Ser. No. 49-6760, filed on Sept. 11th, 1970, in the name of Taisho Pharmaceutical Co. The quantities of metaboric acid used are, however, very high and the effect of this is that the active oxygen content of the finished product is low. Furthermore, the stability of the products obtained is not sufficient when they are mixed with other constituents of washing powders.

It has also been suggested that particles of peroxygenated compounds be coated by various types of stabilizing agents such as mixed compounds obtained by crystallization of sodium carbonate with other mineral salts chosen from sodium bicarbonate and sodium sulfate, as disclosed in Belgian Pat. No. 813,645, filed on Apr. 12th, 1974, in the name of Interox. The stability of the granules thus obtained in the presence of the other constituents of the washing powders is very distinctly improved without, however, reaching that of the peroxygenated compounds with a high stability such as sodium perborate when stored for a very long time.

SUMMARY OF THE PRESENT INVENTION

There has now been found, in accordance with the present invention, a means of obtaining particles of peroxygenated compounds which are particularly stable in the presence of other constituents of washing powders, yet without reducing their active oxygen content.

The present invention, as embodied and broadly described, provides a process for stabilizing particles of peroxygenated compounds by coating, using a solid coating agent, comprising applying a coating agent which contains at least one boron compound selected from the group consisting of orthoboric, metaboric and tetraboric acids.

It is to be understood that both the foregoing general description and the following detailed description are exemplary, but are not restrictive of the invention.

DETAILED DESCRIPTION OF THE INVENTION

In the practice of the present invention, the best results are obtained when the coating agent contains at least one boron compound selected from metaboric and orthoboric acids.

The quantity of boron compound used in the coating agent is generally between 30 and 100% by weight. The best results are obtained when the quantity of boron compound is between 50 and 100% by weight of the weight of the coating agent.

The coating agent can also contain other compounds that are known to have a stabilizing effect on peroxygenated compounds. Among these, one can use notably alkali metal phosphates and silicates.

Advantageously, the quantity of solid coating agent used corresponds to 0.5 to 20% by weight in relation to the weight of the peroxygenated compound to be coated. A quantity of 0.5% by weight is already sufficient to assure at least partial coating of the peroxygenated compound and to assure an increase in stability. In general, there is no need to exceed a quantity of 20% in order to assure complete coating.

It is preferable to use quantities of coating agent corresponding to 1 to 15% by weight of peroxygenated compound.

The present invention can be applied to all peroxygenated compounds, whether organic or inorganic, that are present in the form of particles. It can thus be applied to particles of solid organic peroxides such as peroxides derived from aliphatic, cycloaliphatic and aromatic acids. The invention is applied notably to the stabilization of particles of peroxides derived from aromatic acids, such as dibenzoyl peroxide, phthaloyl peroxide, dipthaloyl peroxide, mono- or poly- peroxytrimellitic, peroxytrimesic, peroxyhemimellitic, peroxypyromellitic, peroxyprehnitic and peroxymellophanic acids.

The present invention can advantageously be applied to the stabilization of particles of peroxygenated mineral compounds such as alkali metal and alkaline earth metal peroxides and the alkali metal persalts which are normally unstable. Among these, the most commonly used are calcium peroxide, magnesium peroxide as well as percarbonates, perpyrophosphates, pertripolyphosphates, persilicates and peroxymonosulfates of alkali metals and more particularly of sodium and potassium. The particles of peroxygenated compounds to be stabilized can contain one single peroxygenated compound or a mixture of peroxygenated compound.

In particular, the present invention can be applied very advantageously to the stabilization of particles of sodium percarbonate.

The particles of peroxygenated compounds stabilized according to the present invention can contain many additives in very variable quantities in addition to the peroxygenated compounds. Among these additives, it is possible to use notably stabilizers such as alkali metal or alkaline earth metal silicates. The additive content depends essentially on the use to which the peroxygenated compound is to be put, the anticipated length of storage and the nature of the peroxygenated compound. In general, their quantity does not exceed 30 and preferably 15% by weight of peroxygenated compounds. Incorporating these stabilizers directly into the particles at the same time as the peroxygenated compounds is, however, insufficient to assure a satisfactory stability of the particles.

The peroxygenated compounds to which the present invention can be applied can be prepared by any method known in itself.

Thus, when the peroxygenated compounds are persalts, it is possible to manufacture particles of peroxygenated compounds by fluidized bed processes, such as those described in Belgian Pat. Nos. 760,508, filed on Dec. 18th, 1970, and 790,351 filed on Oct. 20th, 1972, in the name of Solvay and Cie. It is, however, possible to use other processes for manufacturing particles of persalts based, for example, on their crystallization from their aqueous solutions.

The coating of particles of peroxygenated compounds by coating them according to the present invention can be carried out by any known method.

A preferred technique consists of spraying onto moving particles of peroxygenated compounds an aqueous solution of the constituents of the coating agent and evaporating the water.

The aqueous solution is generally used at a temperature that is slightly lower than, equal to or slightly higher than that of the particles onto which it is sprayed. In general, the temperature of the aqueous solution is between a first temperature which is 25° C. more than the temperature of the particles onto which it is sprayed and a second temperature which is 25° C. less than the temperature of the particles onto which it is sprayed.

The concentration in the aqueous solution of the constituent(s) of the coating agent is preferably also as near as possible to the saturation concentration in the conditions under which the solution is used. In this way, the quantity of water to be evaporated is minimal.

The temperatures at which spraying and evaporation are carried out are obviously chosen according to the nature of the peroxygenated compound. During these operations, the particles of peroxygenated compound are maintained at a lower temperature than the decomposition temperature of the peroxygenated compound and generally lower than 100° C. For evaporation, temperatures between 30° and 95° C. are generally used. In order to obtain a coating containing metaboric acid, it is preferable to use temperatures greater than approximately 70° C., and preferably between 70° and 95° C. In order to obtain a coating containing orthoboric acid, temperatures lower than approximately 70° C. are used and preferably between 30° and 70° C. At about 70° C., a product is obtained which is coated with both acids at the same time.

Spraying can be carried out according to different techniques, for example, in a fluidized bed, on a revolving plate, in a rotating drum or in any other similar device known in itself.

Evaporation can take place at the same time and in the same vessel as spraying or in a separate piece of apparatus. A continuous operation procedure is generally used. A device such as a fluidized bed or other device known in itself can be used. In this case, the temperature of the fluidized bed will be between 30° and 95° C.

The use of a fluidized bed has proved to be particularly advantageous, partly because spraying and evaporation are carried out simultaneously in the same apparatus and partly because this technique allows a more hermetic and more homogeneous coating to be obtained.

Any inert gas and, in particular, air, can be used as fluidization gas. This gas can be heated to maintain the temperature of the fluidized bed at the desired level. It is also possible to use other means of heating, such as a bundle of tubes placed in the fluidized bed.

It is also possible to operate according to a similar process but discontinuously.

The coated particles obtained according to the present invention contain a relatively small quantity of coating agent, and this ensures an active oxygen content that is always high. In addition, as the quantity of aqueous solution of coating agent used is small, evaporation requires fewer calories.

The present invention also relates to washing or bleaching compounds that contain particles of at least one stabilized peroxygenated compound, such as those described above. Such compounds generally contain, in addition to the peroxygenated compound(s), one or more surface active agents chosen from cationic, anionic, nonionic, amphoteric or ampholytic surface active agents, such as, for example, those cited in the book *Surface Active Agents* by A. M. Schwarz and J. W. Perry or in *Encyclopedia of Surface Active Agents*, Vol. I, 1961 and Vol. II, 1964, by I. P. Sisley and P. I. Wood, and one or more detergency aids called "builders" one of whose main functions is to sequester the metallic ions responsible for the hardness of the water such as, for example, sodium tripolyphosphate, sodium nitrilotriacetate and the polyacrylates.

These compounds can also contain other substances chosen in terms of the special field of application of the composition. Among these, one can cite the activators of persalts, optical brighteners, foam inhibitors, enzymes, tarnishing inhibitors and soil anti-redeposition agents, disinfectants, corrosion inhibitors, perfumes, dyestuffs, pH regulators, agents capable of liberating active chlorine, etc.

The particles of peroxygenated compounds coated according to preferred embodiments of the invention satisfy the following test. They do not lose more than 15% active oxygen after 2 weeks when they are mixed in a ratio of 2% by weight in active oxygen with a base detergent powder, that is, a detergent powder containing all the usual ingredients with the exception of any peroxygenated compound, storage being carried out at 28° C. and in a relative humidity of 70% in closed cardboard boxes whose inner and outer walls are covered with a film of cellulose acetate. An example of such a base powder is given in Table II below.

The following examples are given by way of illustration to further explain the principles of the invention. These examples are merely illustrative and are not to be understood as limiting the scope and underlying principles of the invention in any way. All percentages referred to herein are by weight unless otherwise indicated.

The examples below show the remarkable results obtained thanks to the present invention. These examples are given by way of example and not by way of limitation.

COMPARISON EXAMPLES R1 AND R2 AND EXAMPLES 3 TO 6

Storage tests were carried out with particles of sodium percarbonate identified herein as A3, A4 and A5, coated by means of metaboric acid and A6 coated by means of orthoboric acid, the coatings being in conformity with the present invention. By way of comparison, the same storage tests and stability tests were carried out with particles of uncoated sodium percarbonate identified herein as R1, and uncoated sodium perborate tetrahydrate identified herein as R2.

Process for Manufacturing Coated Particles of Percarbonate

Particles of sodium percarbonate manufactured according to a fluidized bed process are used. The composition of the original particles of sodium percarbonate is given in Table I.

The preformed particles were coated by a discontinuous process in a fluidized bed.

The apparatus used consists of a cylinder 15 cm in diameter and 77 cm in height with a gas distribution plate at its base (2 mm holes), and with a bundle of tubes for heating by water vapor expanded at an effective pressure of 1 kg/cm$^2$.

Initially, 3 kg of homogeneous particles of sodium percarbonate are introduced into this apparatus.

Air is passed via the gas distribution plate and an aqueous solution of boric acid is introduced by a pneumatic sprayer placed on the wall 11 cm from the bottom. According to the examples, this solution contains variable quantities of boric acid.

The height of the fluidized bed is 30 cm.

After the aqueous solution has been introduced, granules of coated sodium percarbonate are taken out of the apparatus.

The particular conditions used during the coating of sodium percarbonate are given in Table I below.

TABLE I

| Product | | $A_3$ | $A_4$ | $A_5$ | $A_6$ |
|---|---|---|---|---|---|
| Grade of sodium percarbonate | | | | | |
| Active oxygen content | g/kg | 142 | 142 | 142 | 142 |
| SiO$_2$ content | g/kg | 6.9 | 6.9 | 6.9 | 6.9 |
| Coating conditions | | | | | |
| Temperature of the fluidized bed | °C. | 80 | 78 | 78 | 54 |
| Fluidization air | | | | | |
| Temperature | °C. | 135 | 140 | 140 | 140 |
| Flow rate | Nm$^3$/h | 34 | 35 | 35 | 45 |
| Initial charge of the bed | kg | 3 | 3 | 3 | 3 |
| Sprayer feed | | | | | |
| Air | | | | | |
| Temperature | °C. | 94 | 92 | 92 | 92 |
| Flow rate | Nm$^3$h | 2.5 | 2.4 | 3.4 | 2.4 |
| Effective pressure | kg/cm$^2$ | 1.5 | 1.7 | 2.0 | 1.5 |
| Coating solution | | | | | |
| Temperature | °C. | 93 | 93 | 93 | 97 |

TABLE I-continued

| Product | | $A_3$ | $A_4$ | $A_5$ | $A_6$ |
|---|---|---|---|---|---|
| Flow rate | kg/h | 0.606 | 0.812 | 0.900 | 1.73 |
| Boric acid concentration | % by wt. | 17.5 | 17.5 | 17.5 | 13.0 |

STORAGE TEST IN THE PRESENCE OF A DETERGENT COMPOSITION

The aim of the tests below is to show the stability of percarbonate particles coated according to the present invention during storage in the presence of a detergent composition.

Mixtures are used with 2% active oxygen consisting of 7 g of sodium percarbonate in the form of particles coated according to the present invention, or uncoated particles, or 10.5 g of sodium perborate in the form of uncoated particles, and 42 g of a commercial detergent powder without enzymes, whose composition is given in Table II.

TABLE II

| Composition of the commercial detergent powder without enzymes used for the test of storage in boxes | Without Enzymes g/100 G |
|---|---|
| Soaps | 10 |
| Sodium alkyl sulfonate | 3 |
| Sodium alkylarylsulfonate | 9 |
| Phosphates | 43 |
| Silicates* | 7 |
| Na$_2$CO$_3$ | 2 |
| Na$_2$SO$_4$ | 13 |
| H$_2$O | 12 |
| Various additives (EDTA, cellulose derivatives and optical brightener) | 1 |

*SiO$_2$ total expressed in Na$_2$ · 3SiO$_2$

After homogenization, the mixtures are introduced into cardboard boxes (11.5×7×2 cm) covered at the front and the back with a film of cellulose acetate (permeability 550 g H$_2$O/m$^2$ per day). The boxes thus prepared are then stored at 28° C. in an atmosphere of 70% relative humidity for 4, 8 and 12 weeks, respectively.

Another series of boxes covered with microcrystalline wax (permeability 5 g H$_2$O/m$^2$ per day) are also prepared and stored at 35° C. in an atmosphere of 80% relative humidity for 4, 8 and 12 weeks.

After each storage period, the active oxygen of the powder is measured by direct titration with KMnO$_4$ N/2 and the active oxygen loss is determined in relation to the initial active oxygen. The percentage of active oxygen loss of the particles of sodium percarbonate (PCS) that were coated is compared with percentages of active oxygen loss of the particles of sodium percarbonate that were not coated and the particles of sodium perborate (PBS) (a more stable product taken as a reference) obtained in the same test conditions. The results are expressed according to the following formula I:

$$\frac{T_{PCS\ uncoated} - T_{PCS\ coated}}{T_{PCS\ uncoated} - T_{PBS\ uncoated}} \times 100 = x\%. \qquad I$$

in which T denotes active oxygen loss. They express as a percentage the improvement in the stability of the particles of sodium percarbonate due to coating in relation to the improvement obtained in stability by using uncoated particles of sodium perborate which is taken as a reference because most users regard it as sufficient. Thus, a percentage of 100% indicates that a coated sodium percarbonate has the same stability as sodium perborate. The method of direct titration of the active oxygen with KMnO$_4$ N/2 consists of introducing about 10 g of washing powder weighed with an accuracy of 0.01 g in an Erlenmeyer flask of 750 cm$^3$, adding 100 cm$^3$ of H$_2$SO$_4$ 6 N, 100 cm$^3$ of distilled water and 2 drops of silicones antifoaming agent. The vessel is then agitated until a homogeneous solution is obtained and titration is carried out with the aid of KMnO$_4$ N/2 until a pink color lasting for 30 sec. is obtained. A blank titration is also carried out on an equivalent quantity of washing powder not containing a persalt. The active oxygen content of the sample, O, expressed in g. of oxygen per kg, is given by the relation $$O = (a - b) \times \tfrac{1}{2} \times \frac{1000}{p} \times \frac{0.016}{2}$$

in which:
—a, cm$^3$, designates the volume of KMnO$_4$ N/2 used for the titration of the powder containing the persalt
—b, cm$^3$, designates the volume of KMnO$_4$ N/2 used for the blank titration
—p, g, designates the weight of the sample used.

The results of the tests of storage in boxes, carried out as described above on the particles of sodium percarbonate coated according to the present invention as well as on particles of sodium percarbonate that were not coated and on uncoated particles of sodium perborate, are given in Table III.

These results clearly indicate the superiority of the products of the present invention in relation to the uncoated particles of percarbonate and show elsewhere that the particles of sodium percarbonate coated according to the present invention are as stable if not more stable than those of sodium perborate (see product A5 stored at 35° C. at 80% relative humidity).

What is claimed is:

1. Process for stabilizing particles of peroxygenated compounds by coating by means of a solid coating agent comprising applying a coating agent which contains orthoboric acid.

2. Process according to claim 1, wherein the peroxygenated compound is selected from the group consisting of peroxides derived from organic peroxy acids, alkali metal or alkaline earth metal peroxides, alkali metal persalts and their mixtures.

3. Process according to claim 2, wherein the peroxygenated compound is an alkali metal persalt.

4. Process according to claim 3, wherein the persalt is selected from the group consisting of alkali metal percarbonates, perpyrophosphates, pertripolyphosphates and peroxymonosulfates.

5. Process according to claim 4, wherein the persalt is sodium percarbonate.

6. Process according to claim 1, wherein the coating agent contains 30 to 100% by weight orthoboric acid in relation to the total weight of the coating agent.

7. Process according to claim 1, wherein the coating agent is used in a quantity corresponding to 0.5 to 20% by weight of the peroxygenated compound.

8. Process according to claim 7, wherein the coating agent is used in a quantity corresponding to 1 to 15% by weight of the peroxygenated compound.

9. Process according to claim 1, wherein the coating is carried out by spraying an aqueous solution of the constituents of the coating agent onto the particles of the peroxygenated compound.

10. Process according to claim 9, wherein the particles of the peroxygenated compound are maintained in a fluidized bed during coating.

11. Process according to claim 10, wherein the temperature of the fluidized bed is maintained between 30° and 95° C.

12. Process according to claim 11, wherein the aqueous solution is used at a temperature that is between a first temperature which is 25° C. more than the temperature of the particles on which it is sprayed and a second temperature which is 25° C. less than the temperature of the particles on which it is sprayed.

13. Process according to claim 12, wherein the concentration of the solution is near to the saturation concentration at the temperature at which it is used.

TABLE III

Results of storage tests in boxes in the presence of detergent powder free from enzymes

| Characteristics of percompounds used | | Products | 28° C. 70% relative humidity % loss active oxygen *(% improvement according to formula I in sodium percarbonate stability due to coating.) | | | 35° C. 80% relative humidity % loss active oxygen *(% improvement according to formula I in sodium percarbonate stability due to coating.) | | |
|---|---|---|---|---|---|---|---|---|
| | | | 4 weeks | 8 weeks | 12 weeks | 4 weeks | 8 weeks | 12 weeks |
| Particles of uncoated sodium percarbonate Mean diameter - 0.225 mm | | R$_1$ | 11 | 16 | 24 | 25 | 45 | 68 |
| Particles of uncoated sodium perborate Mean diameter - 0.285 mm | | R$_2$ | 2 | 4 | 5 | 6 | 14 | 29 |
| Particles of sodium percarbonate coated by: | Metaboric acid | | | | | | | |
| | 2.5% by wt. | A$_3$ | 3.5 | 10 *(50) | 15 | 10 *(79) | 18 *(87) | 32 *(92) |
| | 5% by wt. | A$_4$ | 2.5 | 8.5 | 13 | 8.5 *(87) | 15 | 27 |
| | 10% by wt. | A$_5$ | 1 | 7 *(75) | 11 | 6 *(100) | 13 *(103) | 21 *(121) |
| | Orthoboric acid | | | | | | | |
| | 5% by wt. | A$_6$ | 3 | 9 | 14 | 10 *(79) | 17 | 31 |

The % by weight are expressed in relation to the total weight of the granules.

It will be understood that the above description of the present invention is susceptible to various modifications, changes and adaptations, and the same are intended to be comprehended within the meaning and range of equivalents of the appended claims.

14. Process according to claim 10, wherein the temperature of the fluidized bed is maintained above 70° C. approximately.

15. Process according to claim 14, wherein the temperature of the fluidized bed is between 70° and 95° C.

16. Process according to claim 11, wherein the temperature of the fluidized bed is maintained below 70° C. approximately.

17. Process according to claim 16, wherein the temperature of the fluidized bed is between 30° and 70° C.

18. Particles of peroxygenated compounds obtained according to claim 1.

19. Washing or bleaching compounds containing particles according to claim 18.

20. Process for stabilizing particles of peroxygenated compounds by coating by means of a solid coating agent comprising applying a coating agent which contains at least one boron compound selected from the group consisting of metaboric acid, orthoboric acid and tetraboric acid, wherein the coating is carried out by spraying an aqueous solution of the constituents of the coating agent onto the particles of the peroxygenated compound.

21. Process according to claim 20, wherein the particles of the peroxygenated compound are maintained in a fluidized bed during coating.

22. Process according to claim 21, wherein the temperature of the fluidized bed is maintained between 30° and 95° C.

23. Process according to claim 22, wherein the aqueous solution is used at a temperature that is between a first temperature which is 25° C. more than the temperature of the particles on which it is sprayed and a second temperature which is 25° C. less than the temperature of the particles on which it is sprayed.

24. Process according to claim 23, wherein the concentration of the solution is near to the saturation concentration at the temperature at which it is used.

25. Process according to claim 21, wherein the temperature of the fluidized bed is maintained above 70° C. approximately.

26. Process according to claim 25, wherein the temperature of the fluidized bed is between 70° and 95° C.

27. Process according to claim 22, wherein the temperature of the fluidized bed is maintained below 70° C. approximately.

28. Process according to claim 27, wherein the temperature of the fluidized bed is between 30° and 70° C.

* * * * *